(12) United States Patent
Kim et al.

(10) Patent No.: US 11,329,835 B2
(45) Date of Patent: May 10, 2022

(54) APPARATUS AND METHOD FOR AUTHENTICATING IOT DEVICE BASED ON PUF USING WHITE-BOX CRYPTOGRAPHY

(71) Applicant: ELECTRONICS AND TELECOMMUNICATIONS RESEARCH INSTITUTE, Daejeon (KR)

(72) Inventors: Byoung-Koo Kim, Daejeon (KR); Seung-Yong Yoon, Daejeon (KR); You-Sung Kang, Daejeon (KR); Doo-Ho Choi, Cheonan-si (KR); Ik-Kyun Kim, Daejeon (KR); Tae-Sung Kim, Daejeon (KR); Mi-Kyung Oh, Daejeon (KR); Sang-Jae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 234 days.

(21) Appl. No.: 16/855,754

(22) Filed: Apr. 22, 2020

(65) Prior Publication Data

US 2021/0036873 A1    Feb. 4, 2021

(30) Foreign Application Priority Data

Aug. 1, 2019    (KR) .................. KR10-2019-0093848

(51) Int. Cl.
*H04L 9/32*    (2006.01)
*G06F 21/44*    (2013.01)
(Continued)

(52) U.S. Cl.
CPC .......... *H04L 9/3278* (2013.01); *H04L 9/0869* (2013.01); *H04L 63/0876* (2013.01)

(58) Field of Classification Search
CPC .................. G06F 21/125; G06F 21/14; G06F 2221/2103; H04L 9/088; H04L 9/3278;
(Continued)

(56) References Cited

U.S. PATENT DOCUMENTS 9,324,436 B2    4/2016 Kim et al.
9,448,874 B2    9/2016 Kim et al.
(Continued)

FOREIGN PATENT DOCUMENTS

EP    2326043 A1 *  5/2011    .......... H04L 9/3278
KR    10-2013-0129334 A    11/2013
(Continued)

OTHER PUBLICATIONS

Delvaux, Jeroen, et al. "A survey on lightweight entity authentication with strong PUFs." ACM Computing Surveys (CSUR) 48.2 (2015): 1-42. (Year: 2015).*
(Continued)

*Primary Examiner* — Michael Simitoski
(74) *Attorney, Agent, or Firm* — Rabin & Berdo, P.C.

(57) ABSTRACT

Disclosed herein are an apparatus and method for authenticating an IoT device. The method, performed by the IoT device authentication apparatus, includes transmitting, by the IoT device authentication apparatus, a random number to the IoT device and encrypting, by the IoT device authentication apparatus, the random number using a previously registered first white-box cryptography value through a white-box cryptography method; generating, by the IoT device, a first device response value from a previously registered first device challenge value using a Physical Unclonable Function (PUF) and encrypting, by the IoT device, the random number, received from the IoT device authentication apparatus, using the first device response value; and performing, by the IoT device authentication
(Continued)

apparatus, authentication of the IoT device by checking whether the random number encrypted using the white-box cryptography method matches the random number encrypted using the PUF, which is received from the IoT device.

17 Claims, 5 Drawing Sheets

(51) Int. Cl.
*H04L 9/08* (2006.01)
*H04L 29/06* (2006.01)
*G06F 7/58* (2006.01)

(58) Field of Classification Search
CPC . H04L 9/0869; H04L 9/3273; H04L 2209/16; H04L 63/0876; H04W 12/041
See application file for complete search history.

(56) References Cited

U.S. PATENT DOCUMENTS

| | | | |
|---|---|---|---|
| 9,787,670 B2 | 10/2017 | Kim et al. | |
| 10,511,436 B1* | 12/2019 | Machani | H04L 9/30 |
| 11,232,718 B2* | 1/2022 | Norrman | H04L 9/3278 |
| 2015/0012737 A1* | 1/2015 | Newell | G06F 21/575 |
| | | | 713/2 |
| 2019/0012664 A1* | 1/2019 | Viola | G06F 21/64 |
| 2019/0165955 A1* | 5/2019 | Wu | G11C 16/0483 |
| 2021/0194666 A1* | 6/2021 | Georgieva | H04L 9/0838 |

FOREIGN PATENT DOCUMENTS

| | | |
|---|---|---|
| KR | 10-2014-0045829 A | 4/2014 |
| KR | 10-2014-0071775 A | 6/2014 |
| KR | 101488433 B1 | 2/2015 |
| KR | 10-2015-0135032 A | 12/2015 |
| KR | 1020180007459 A | 1/2018 |
| KR | 1020180130203 A | 12/2018 |
| WO | WO-2011120974 A1 * 10/2011 | ............ G06F 21/31 |

OTHER PUBLICATIONS

Park, Jong-Yeon, et al. "A whitebox cryptography application for mobile device security against whitebox attacks—how to apply WBC on mobile device." 2014 International Conference on IT Convergence and Security (ICITCS). IEEE, 2014. (Year: 2014).*
Wallrabenstein, John Ross. "Practical and secure IoT device authentication using physical unclonable functions." 2016 IEEE 4th international conference on future internet of things and cloud (FiCloud). IEEE, 2016. (Year: 2016).*
Shin Ju Seok et al., "Symmetric Key-based RFID Mutual Authentication Protocol Utilizing PUF," Korea Institute Of Communication Sciences, Proceedings of Symposium of the Korean Institute of communications and Information Sciences, Jun. 2010, pp. 790-791.

* cited by examiner

APPARATUS AND METHOD FOR AUTHENTICATING IOT DEVICE BASED ON PUF USING WHITE-BOX CRYPTOGRAPHY

CROSS REFERENCE TO RELATED APPLICATION

This application claims the benefit of Korean Patent Application No. 10-2019-0093848, filed Aug. 1, 2019, which is hereby incorporated by reference in its entirety into this application.

BACKGROUND OF THE INVENTION

1. Technical Field

The present invention relates generally to technology for authenticating Internet-of-Things (IoT) devices, and more particularly to technology for authenticating IoT devices using white-box cryptography and Physical Unclonable Function (PUF) technology.

2. Description of the Related Art

Currently, security applied to most IoT devices is software-based security. However, even though various forms of software-based security are applied, cases of hacking and damage are frequently reported. Because most IoT devices are lightweight and low-power systems, it is difficult to apply heavy software-based security, so in many cases, a security system is applied with an emphasis on light weight rather than stability. Also, due to software-based security characteristics, a key is stored in memory, which increases the possibility of damage. Recently, thanks to the rapid development of IT technology, state-of-the-art devices have emerged, but economic and industrial losses incurred from damage due to illegal replication or forgery are increasing day by day.

In order to solve the above-mentioned problems, a Physical Unclonable Function (PUF) has emerged. A PUF is technology for imparting a unique characteristic to each device, similar to biometric information, such as a fingerprint, an iris, or the like of a human, and enables devices to have different characteristics even though the devices are produced through the same manufacturing process. That is, even though devices are produced using the same method, the unique characteristic of each device cannot be cloned. Accordingly, when a non-replicable PUF is implemented using any of various methods, there is no need to store a key generated through the PUF, whereby security stability may be improved. The key generated using PUF technology may be used in order to encrypt the data to be stored in memory that can be leaked or to authenticate a communication target device through IoT device authentication.

When the above-described PUF technology is used for authentication, a unique identifier for identifying each device may be generated inside the device without inputting the unique identifier from the outside. Also, because it is not necessary to allocate internal nonvolatile memory for storing each identifier, a cost reduction can be expected. The PUF technology is configured such that circuits produced through the same manufacturing process have different output values when provided with the same input value. Therefore, a pair comprising the input and output of each PUF circuit may be used as a challenge-response pair (CRP) for authenticating each device. That is, a list of CRPs for authenticating devices is stored in the database of an authentication server in advance, and a CRP generated through the PUF of the device to be authenticated is compared therewith, whereby each device may be authenticated.

Meanwhile, Korean Patent Application Publication No. 10-2013-0129334, titled "Apparatus and method for authentication between devices based on PUF over machine-to-machine communication" discloses a method for performing security authentication between devices for machine-to-machine communication.

SUMMARY OF THE INVENTION

Accordingly, the present invention has been made keeping in mind the above problems occurring in the conventional art, and an object of the present invention is to provide a method for authenticating an IoT device based on PUF technology.

Another object of the present invention is to provide an effective device authentication method for preventing a security threat, which can result from exposure of an authentication key, while minimizing the load on an authentication server.

A further object of the present invention is to provide an authentication method that is robust to the exposure of an authentication key while minimizing the load on an authentication server, which is a problem with the existing method for authenticating an IoT device using PUF technology.

In order to accomplish the above objects, a method for authenticating an IoT device, performed by an IoT device authentication apparatus, according to an embodiment of the present invention may include transmitting, by the IoT device authentication apparatus, a random number to the IoT device and encrypting, by the IoT device authentication apparatus, the random number using a previously registered white-box cryptography value through a white-box cryptography method; generating, by the IoT device, a first device response value from a previously registered first device challenge value using a Physical Unclonable Function (PUF) and encrypting, by the IoT device, the random number, received from the IoT device authentication apparatus, using the first device response value; and checking, by the IoT device authentication apparatus, whether the random number encrypted using the white-box cryptography method matches the random number encrypted using the PUF, which is received from the IoT device, thereby performing authentication of the IoT device.

Here, the method may further include generating a second white-box cryptography value using the PUF.

Here, generating the second white-box cryptography value may be configured such that, if authentication of the IoT device succeeds when authentication of the IoT device is performed, the IoT device authentication apparatus encrypts a previously registered first server challenge value using the first white-box cryptography value, and such that the IoT device decrypts the encrypted first server challenge value, received from the IoT device authentication apparatus, using the first device response value.

Here, generating the second white-box cryptography value may be configured such that the IoT device performs authentication of the IoT device authentication apparatus by checking whether the decrypted first server challenge value matches the previously registered first device challenge value.

Here, generating the second white-box cryptography value may be configured such that, if authentication of the IoT device succeeds when authentication of the IoT device is performed, the IoT device authentication apparatus generates a second device challenge value by combining the first device challenge value with the random number, generates a second device response value from the second device challenge value through the PUF, and generates the second white-box cryptography value using the second device response value.

Here, generating the second white-box cryptography value may be configured such that the IoT device authentication apparatus generates a second server challenge value by combining the first server challenge value with the random number, generates a second server response value from the second server challenge value through the PUF, and generates the second white-box cryptography value using the second server response value.

Here, generating the second white-box cryptography value may be configured such that the IoT device updates the first device challenge value with the second device challenge value, and such that the IoT device authentication apparatus updates the first server challenge value and the first white-box cryptography value with the second server challenge value and the second white-box cryptography value.

Here, generating the second white-box cryptography value may be configured such that, if authentication of the IoT device succeeds when authentication of the IoT device is performed, the IoT device generates a second device challenge value by combining the first device challenge value with the random number, generates a second device response value from the second device challenge value through the PUF, and generates the second white-box cryptography value using the second device response value as an encryption key.

Here, generating the second white-box cryptography value may be configured such that the IoT device updates the first device challenge value with the second device challenge value, and such that the IoT device authentication apparatus updates the first white-box cryptography value with the second white-box cryptography value.

Also, in order to accomplish the above objects, an apparatus for authenticating an IoT device according to an embodiment of the present invention may include one or more processors and executable memory for storing at least one program executed by the one or more processors. The at least one program may transmit a random number to the IoT device, encrypt the random number using a previously registered first white-box cryptography value through a white-box cryptography method, and perform authentication of the IoT device by checking whether the random number encrypted using the white-box cryptography method matches the random number encrypted using a Physical Unclonable Function (PUF), which is received from the IoT device, and the IoT device may generate a first device response value from a previously registered first device challenge value using the PUF and encrypt the random number, received from the apparatus, using the first device response value.

Here, the at least one program may encrypt a previously registered first server challenge value using the first white-box cryptography value when authentication of the IoT device succeeds, and the IoT device may decrypt the encrypted first server challenge value, received from the apparatus, using the first device response value.

Here, the IoT device may perform authentication of the apparatus by checking whether the decrypted first server challenge value matches the previously registered first device challenge value.

Here, when authentication of the apparatus succeeds, the IoT device may generate a second device challenge value by combining the first device challenge value with the random number, generate a second device response value from the second device challenge value through the PUF, and generate a second white-box cryptography value using the second device response value.

Here, the at least one program may generate a second server challenge value by combining the first server challenge value with the random number, generate a second server response value from the second server challenge value through the PUF, and generate the second white-box cryptography value using the second server response value.

Here, the IoT device may update the first device challenge value with the second device challenge value, and the at least one program may update the first server challenge value and the first white-box cryptography value with the second server challenge value and the second white-box cryptography value.

Here, when authentication of the IoT device succeeds, the IoT device may generate a second device challenge value by combining the first device challenge value with the random number, generate a second device response value from the second device challenge value through the PUF, and generate a second white-box cryptography value using the second device response value as an encryption key.

Here, the IoT device may update the first device challenge value with the second device challenge value, and the apparatus may update the first white-box cryptography value with the second white-box cryptography value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including", specify the presence of stated elements but do not preclude the presence or addition of one or more other elements unless otherwise specified.

Hereinafter, a preferred embodiment of the present invention will be described in detail with reference to the accompanying drawings.

Figure 1:
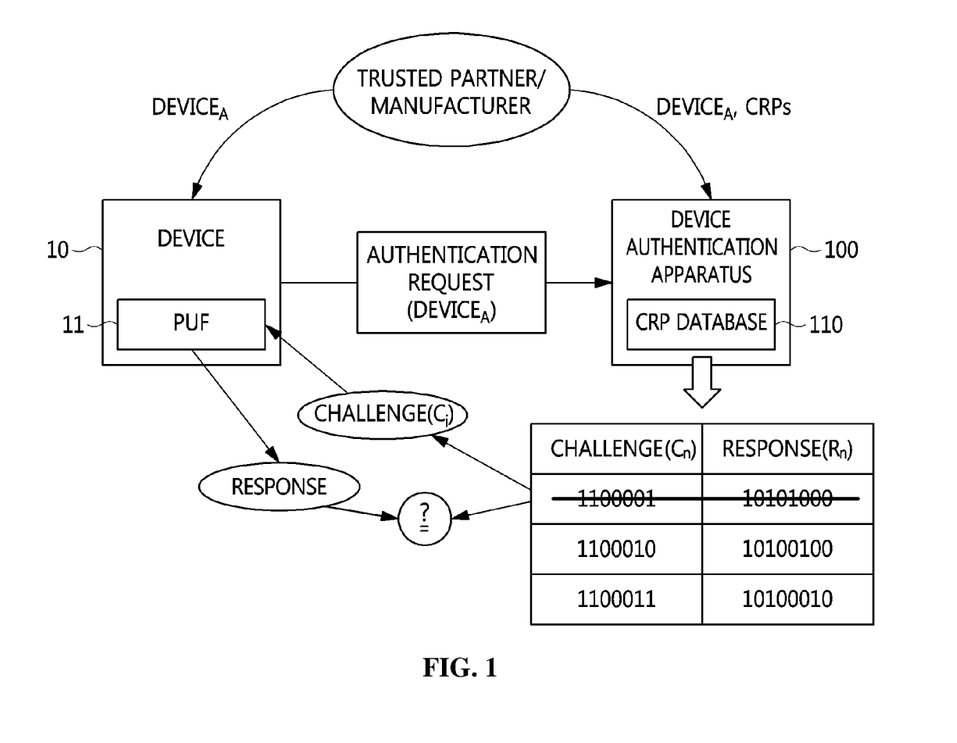
FIG. 1 is a view illustrating an apparatus for authenticating an IoT device based on a PUF.

FIG. 1 is a view illustrating an apparatus for authenticating an IoT device.

As shown in FIG. 1, the IoT device authentication apparatus 100 manages CRPs for each IoT device 10 by storing the same in a CRP database 110 and transmits a challenge value Ci, which is randomly selected from among n CRPs, to a specific IoT device A in response an authentication request therefrom. The IoT device 10 generates a response value for the received challenge value using a PUF module 11 and replies with the response value, and the IoT device authentication apparatus 100 checks whether the response value matches a response value for the corresponding challenge value, which is stored in the server, thereby authenticating the IoT device 10. Here, a CRP that has been used once may be deleted in order to prevent sniffing, a replay attack, or the like. However, this authentication method based on a PUF requires the IoT device authentication apparatus 100 to store and manage a large number of CRPs for each IoT device 10 registered therein, and the number of CRPs increases in proportion to the number of devices registered in the IoT device authentication apparatus 100. Also, various security threats can be generated when CRPs of the IoT device authentication apparatus 100, which are stored in a storage medium, are exposed through various paths. Accordingly, required is an effective CRP management method that is robust to the exposure of an authentication key while reducing the load on the IoT device authentication apparatus 100.

The present invention provides an apparatus and method for authenticating an IoT device based on a PUF using white-box cryptography. That is, the present invention may provide an efficient device authentication method that is able not only to minimize the load on an authentication server, corresponding to the IoT device authentication apparatus 100, using a more effective CRP management method but also to minimize a security threat, which can result from the exposure of CRP information used as an authentication key, using white-box cryptography.

Figure 2:
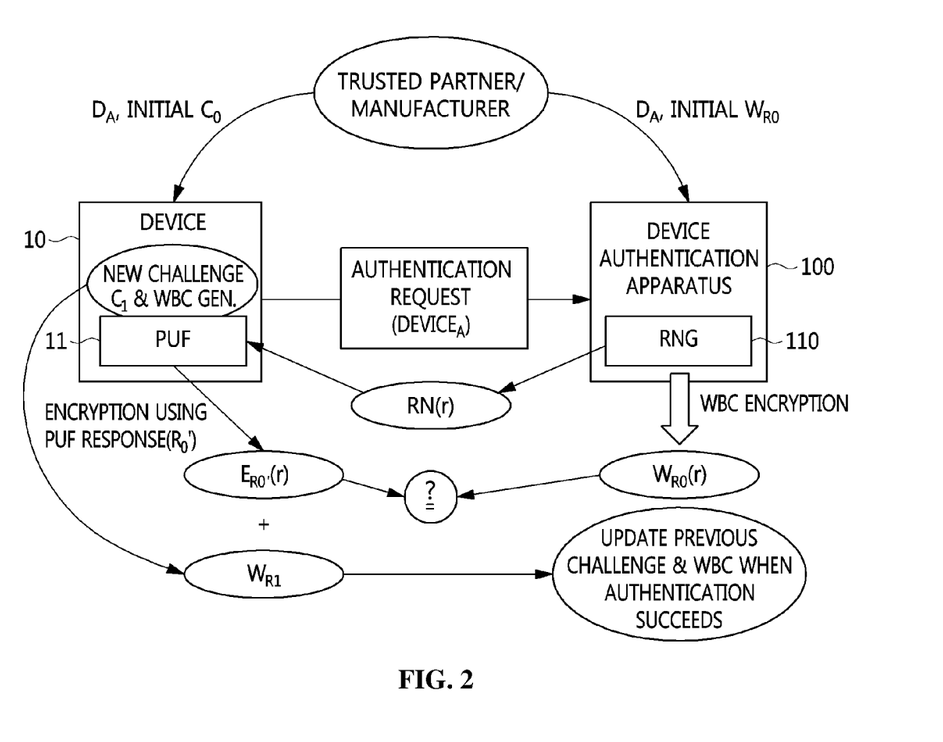
FIG. 2 is a view illustrating an apparatus for authenticating an IoT device based on a PUF using white-box cryptography according to an embodiment of the present invention.

FIG. 2 is a view illustrating an apparatus for authenticating an IoT device based on a PUF using white-box cryptography according to an embodiment of the present invention.

Referring to FIG. 2, the apparatus for authenticating an IoT device based on a PUF using white-box cryptography according to an embodiment of the present invention may be a device authentication apparatus 100, and a device 10 may be an IoT device including a PUF module 11.

The present invention may provide an authentication method that minimizes threats of authentication key exposure through white-box cryptography when an IoT device is authenticated based on a PUF. This authentication method does not require management of multiple CRPs, unlike the existing PUF-based authentication method, and fundamentally prevents the exposure of a CRP in an authentication server or along a communication path, whereby a more secure and effective device authentication method may be provided.

White-box cryptography is a scheme for protecting an encryption key from an attacker by mixing information about the encryption key with an encryption algorithm implemented in software in order to prevent the encryption key from being predicted. The apparatus and method for authenticating an IoT device based on a PUF using white-box cryptography according to an embodiment of the present invention may be used in order to encrypt plaintext without exposure of an encryption key by using white-box cryptography.

As illustrated in FIG. 2, the device authentication apparatus 100 and the device 10 may start operations using authentication information based on a single initial CRP, which is derived from the PUF module 11.

Here, each device 10 has only the challenge value $C_0$ of the initial CRP, and the device authentication apparatus 100 may have a white-box cryptography (WBC) value $W_{R0}$ acquired using a response value $R_0$, generated from the challenge value, as an encryption key. R0 or R1 in the figures may indicate $R_0$ or $R_1$.

Here, the initial configuration of the device 10 and the device authentication apparatus 100 may be performed in a manufacturing process or other secure environment. In such initial configuration, the device authentication apparatus 100 may generate an arbitrary random number (RN) r using a random number generator (RNG) module 111 in response to an authentication request from a specific device A.

Here, the RNG module 111 may transmit the generated random number r to the device 10 and encrypt ($W_{R0}(r)$) the random number using a previously registered white-box cryptography value.

Here, when the corresponding device 10 receives the random number r from the device authentication apparatus 100, the PUF module 11 may generate a response value $R_0'$, corresponding to the initial challenge value $C_0$ previously stored in the device 10, using a PUF. Then, the device 10 may return $E_{R0'}(r)$, which is the result of encrypting r using the response value $R_0'$ as an encryption key, to the device authentication apparatus 100 (in which case the encryption algorithm used for the white-box cryptography of the device authentication apparatus 100 and the encryption algorithm used by the device are the same symmetric key encryption algorithm, which is one of various encryption schemes, such as DES, AES and the like, and the encryption algorithm may be executed in consideration of device resources). Then, the device authentication apparatus 100 checks whether the ciphertext $W_{R0}(r)$, previously generated by performing encryption using a white-box cryptography method, matches the ciphertext $E_{R0'}(r)$, generated using a PUF and received from the device 10, thereby authenticating the device 10. When authentication of the device 10 succeeds, the device 10 may generate a new challenge value $C_1$ based on the initial challenge value $C_0$, which is previously registered in the device 10, and on the random number r received from the device authentication apparatus 100, and may then generate a response value $R_1$, corresponding to the new challenge value $C_1$, from the PUF module 11. Then, the device 10 may generate a new white-box cipher $W_{R1}$, which uses the response value $R_1$ as an encryption key, and transmit the same to the device authentication apparatus 100. Accordingly, the device 10 and the device authentication apparatus 100 may perform authentication functions by continuously updating the initial challenge value, previously registered in the device 10, and the white-box cipher. In the case of the above-described apparatus and method for authenticating an IoT device according to an embodiment of the present invention, it is not necessary to manage multiple CRPs for device authentication, unlike the existing authentication method, and a CRP is prevented from being exposed not only in an authentication server, corresponding to the device authentication apparatus 100, but also along a communication path. Therefore, a security threat arising from exposure of an authentication key may be fundamentally prevented. Also, a method in which pieces of information necessary for authentication are continuously updated based on a single CRP is provided, whereby there may be provided an authentication method that is able not only to minimize the load on the authentication server but also to securely manage the authentication key.

Figure 3:
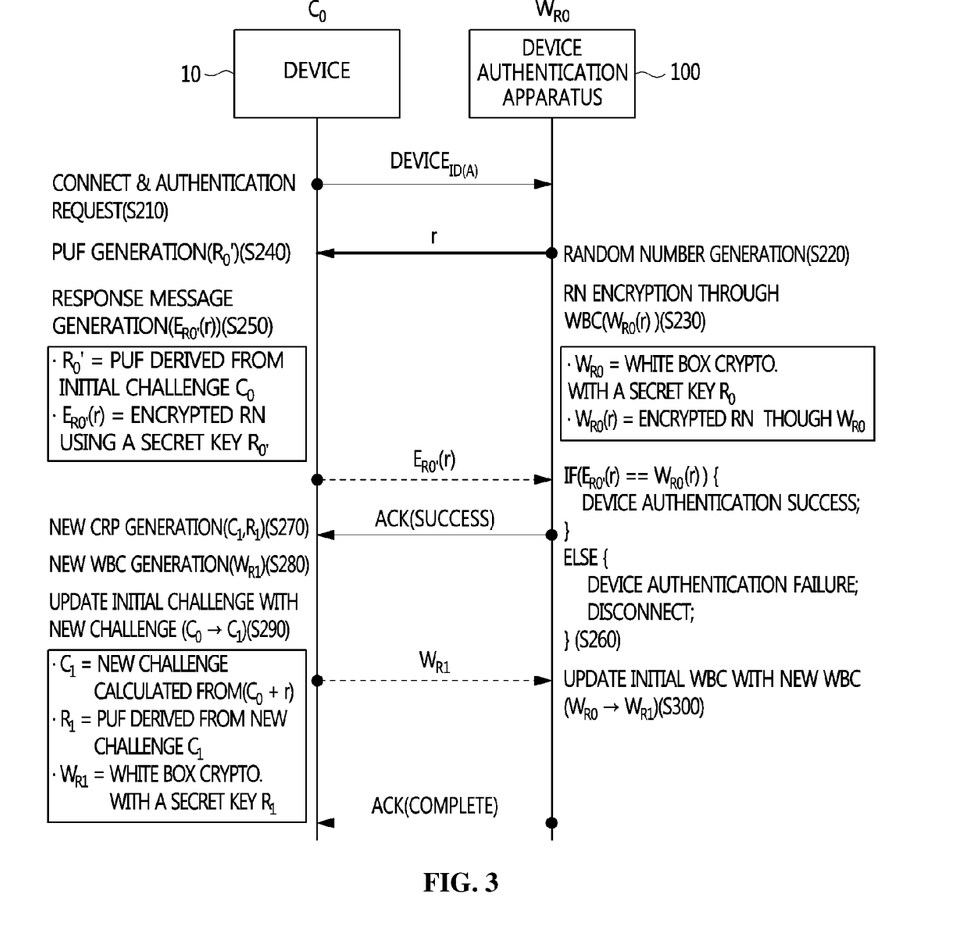
FIG. 3 is a sequence diagram illustrating a method for authenticating an IoT device based on a PUF using white-box cryptography according to an embodiment of the present invention.

FIG. 3 is a sequence diagram illustrating a method for authenticating an IoT device based on a PUF using white-box cryptography according to an embodiment of the present invention.

Referring to FIG. 3, in the method for authenticating an IoT device based on a PUF using white-box cryptography according to an embodiment of the present invention, first, a device 10 may request a device authentication apparatus 100 to authenticate the device 10 with the unique device ID thereof at step S210.

The device 10 may transmit an authentication request including the unique device ID A thereof to the device authentication apparatus 100 at step S210.

In order to authenticate the device, the device authentication apparatus 100 may deliver an arbitrary random number r, generated through an RNG module 111, to the device 10 at step S220.

Here, at step S220, the device authentication apparatus 100 may transmit the random number to the device 10.

Simultaneously with the transmission of the random number r to the device 10, the device authentication apparatus 100 may encrypt ($W_{R0}(r)$) the random number r using a previously registered white-box cryptography value $W_{R0}$ at step S230.

Here, at step S230, the random number may be encrypted using the previously registered first white-box cryptography value through a white-box cryptography method.

After it receives the random number r, the device 10 may generate a device response value $R_{0'}$ from a previously registered initial device challenge value $C_0$ through a PUF module 11 at step S240.

Here, at step S240, the IoT device 10 may generate a first device response value from the previously registered first device challenge value using the PUF.

The device 10 may encrypt ($E_{R0'}(r)$) the received value r using the generated device response value $R_{0'}$ as a secret key and return the encrypted value to the device authentication apparatus 100 at step S250.

Here, at step S250, using the first device response value, the random number received from the IoT device authentication apparatus 100 may be encrypted.

The device authentication apparatus 100 checks whether the ciphertext $E_{R0'}(r)$ received from the device 10 matches the ciphertext $W_{R0}(r)$, which is generated by the device authentication apparatus 100 through white-box cryptography at step S230, thereby performing authentication of the device 10 at step S260.

Here, at step S260, the device authentication apparatus 100 may authenticate the device 10 by checking whether the random number encrypted using the white-box cryptography method matches the random number encrypted using a PUF, which is received from the device 10.

Here, at step S260, when the ciphertext encrypted using white-box cryptography is determined to be the same as the ciphertext encrypted using a PUF, the device authentication apparatus 100 may transmit an authentication success message to the device 10, but when authentication of the device fails, the session may be terminated.

When it receives the authentication success message, the device 10 may generate a new device challenge value $C_1$ to be used for the next authentication by combining the previously registered initial device challenge value $C_0$ with the random number r received from the device authentication apparatus 100, and may then generate a new device response value $R_1$ from the new device challenge value $C_1$ through the PUF module 11 at step S270.

The device 10 may generate a new white-box cipher $W_{R1}$ using the new device response value $R_1$, which is generated at step S270, as an encryption key at step S280.

Here, at step S280, a second white-box cryptography value may be generated using the PUF.

Here, at step S280, when authentication of the device 10 succeeds at step S260, the device 10 may generate a second device challenge value by combining the first device challenge value with the random number, generate a second device response value from the second device challenge value through the PUF, and generate a second white-box cryptography value using the second device response value as an encryption key.

The device 10 may deliver the new white-box cipher generated at step S280 to the device authentication apparatus 100, and may update the initial device challenge value $C_0$ thereof with the new device challenge value $C_1$ at step S290.

Here, at step S290, the device 10 may update the first device challenge value with the second device challenge value, and the device authentication apparatus 100 may update the first white-box cryptography value with the second white-box cryptography value.

The device authentication apparatus 100 may update the initial white-box cipher $W_{R0}$ with the white-box cipher $W_{R1}$ received from the device 10 and may terminate authentication at step S300 by transmitting the final ACK to the device 10.

Here, the first device challenge value may be the initial device challenge value $C_0$ that is previously registered in the device 10, and the second device challenge value may be the new device challenge value $C_1$.

Here, the first device response value may be the response value $R_{0'}$ generated in the device 10, and the second device response value may be the new response value $R_1$.

Here, the first white-box cryptography value may be the initial white-box cryptography value $W_{R0}$, and the second white-box cryptography value may be the new white-box cryptography value $W_{R1}$.

Figure 4:
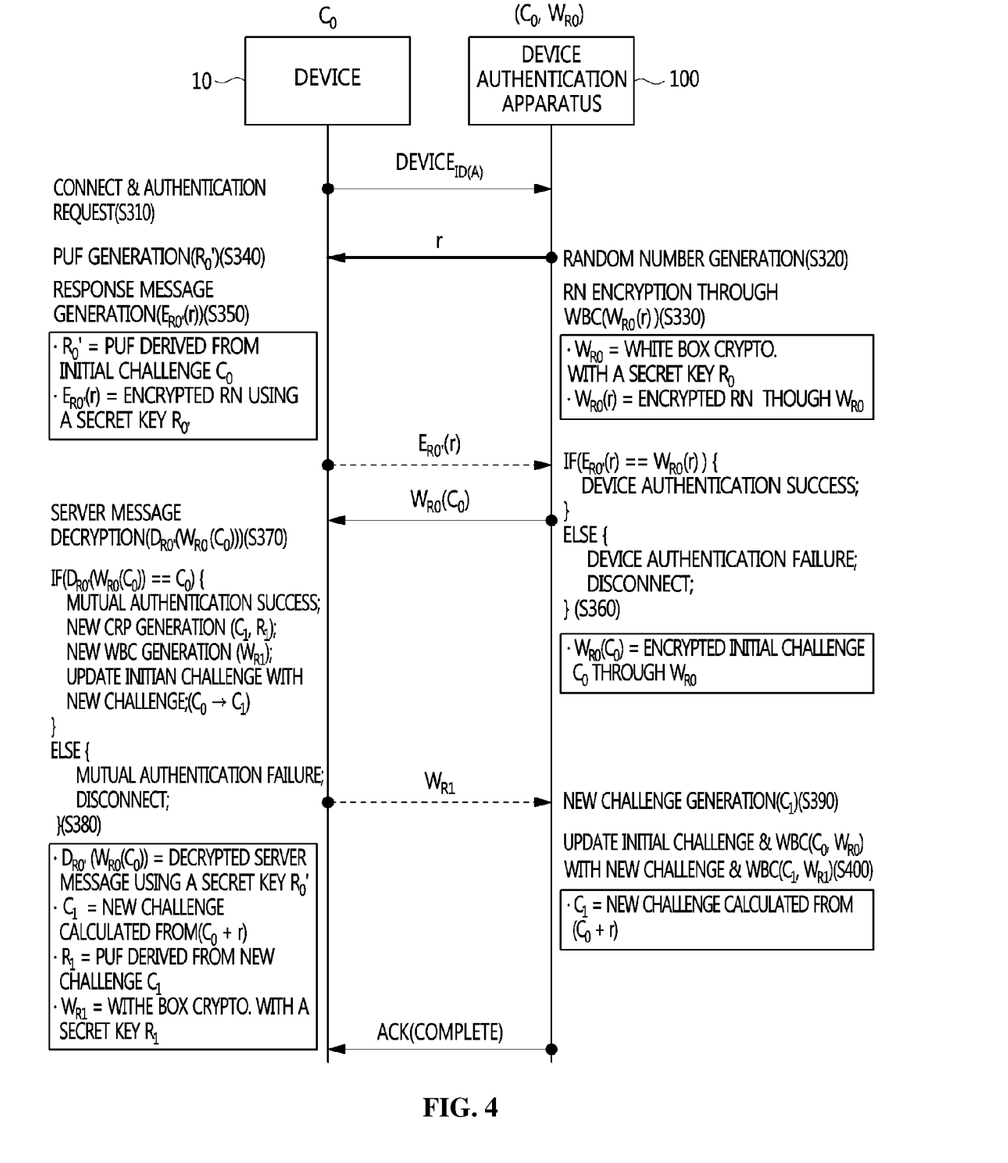
FIG. 4 is a sequence diagram illustrating another example of a method for authenticating an IoT device based on a PUF using white-box cryptography according to an embodiment of the present invention.

FIG. 4 is a sequence diagram illustrating a mutual authentication method of an IoT device based on a PUF using white-box cryptography according to an embodiment of the present invention.

Referring to FIG. 4, the mutual authentication method of an IoT device based on a PUF using white-box cryptography according to an embodiment of the present invention is an expanded form of the IoT device authentication method described with reference to FIG. 3, and is a method for mutual authentication between the IoT device 10 and the IoT device authentication apparatus 100. The initial configurations of the device 10 to be authenticated and the device authentication apparatus 100 for performing mutual authentication are similar to those described with reference to FIG. 3, but the initial challenge value registered in the device may be additionally registered in the device authentication apparatus 100. That is, the device authentication apparatus may start operation after all of a server challenge value $C_0$, which is generated based on initial CRP information derived from the PUF 11 of the device 10, and a white-box cipher $W_{R0}$, which uses a server response value $R_0$, corresponding to the server challenge value $C_0$, as an encryption key, are registered.

Here, in the mutual authentication method of an IoT device based on a PUF using white-box cryptography according to an embodiment of the present invention, the device authentication process is performed in the same manner as steps from S210 to S260 in FIG. 3, and the operations performed after device authentication succeeds at step S260 may be described as follows. That is, steps S310 to S350 are the same as steps S210 to S250, and thus a description thereof will be omitted.

When authentication of the device 10 succeeds at step S260 in FIG. 3, the device authentication apparatus 100 may encrypt ($W_{R0}(C_0)$) the previously registered initial server challenge value $C_0$ using the previously registered white-box cipher $W_{R0}$ and transmit the same to the device 10 at step S360.

Here, when authentication of the device 10 succeeds at step S260, the device authentication apparatus 100 may encrypt the previously registered first server challenge value using the first white-box cryptography value at step S360.

The device 10 may decrypt ($D_{R0'}(W_{R0}(C_0))$) the received ciphertext $W_{R0}(C_0)$ using the previously generated device response value $R_{0'}$ as a secret key at step S370.

Here, at step S370, the device 10 may decrypt the encrypted first server challenge value, which is received from the device authentication apparatus 100, using the first device response value.

The device 10 checks whether $D_{R0'}(W_{R0}(C_0))$, which is the result of decryption performed at step S370, matches the previously registered initial device challenge value $C_0$, thereby performing authentication of the device authentication apparatus 100 at step S380.

Here, at step S380, the device 10 may perform authentication of the IoT device authentication apparatus 100 by checking whether the decrypted first server challenge value matches the previously registered first device challenge value.

Here, at step S380, when the decrypted value $D_{R0'}(W_{R0}(C_0))$ is determined to be the same as the previously registered initial device challenge value $C_0$, the device 10 may generate a new device challenge value $C_1$ and a white-box cipher $W_{R1}$ in the same manner as in step S270 in FIG. 3, and may update the initial device challenge value $C_0$ thereof with the new device challenge value $C_1$ simultaneously with transmitting the new white-box cipher to the device authentication apparatus 100. Conversely, when mutual authentication fails, the session may be terminated.

When it receives the authentication success message and the new white-box cipher $W_{R1}$ from the device 10, the device authentication apparatus 100 may generate a new server challenge value $C_1$ in the same manner as the manner used in the device 10 at step S390.

Here, when authentication of the device 10 succeeds at step S260, the device authentication apparatus 100 may generate a second device challenge value by combining the first device challenge value with the random number, generate a second device response value from the second device challenge value through the PUF, and generate a second white-box cryptography value using the second device response value at step S390.

Here, at step S390, the device authentication apparatus 100 may generate a second server challenge value by combining the first server challenge value with the random number, generate a second server response value from the second server challenge value through the PUF, and generate a second white-box cryptography value using the second server response value.

Here, at step S390, the device authentication apparatus 100 may update the previously registered initial server challenge value $C_0$ and the white-box cipher $W_{R0}$ with the new server challenge value $C_1$ and the new white-box cipher $W_{R1}$ and transmit the final ACK to the device 10, thereby terminating mutual authentication.

Here, at step S390, the device 10 may update the first device challenge value with the second device challenge value, and the device authentication apparatus 100 may update the first server challenge value and the first white-box cryptography value with the second server challenge value and the second white-box cryptography value.

Here, the first device challenge value may be the initial device challenge value $C_0$ that is previously registered in the device 10, and the second device challenge value may be the new device challenge value $C_1$.

Here, the first server challenge value may be the initial server challenge value $C_0$ that is previously registered in the device authentication apparatus 100, and the second server challenge value may be the new server challenge value $C_1$.

Here, the first device response value may be the response value $R_{0'}$ generated in the device 10, and the second device response value may be the new response value $R_1$.

Here, the first server response value may be the response value $R_0$ generated in the device authentication apparatus 100, and the second server response value may be the new response value $R_1$.

Here, the first white-box cryptography value may be the initial white-box cryptography value $W_{R0}$, and the second white-box cryptography value may be the new white-box cryptography value $W_{R1}$.

Figure 5:
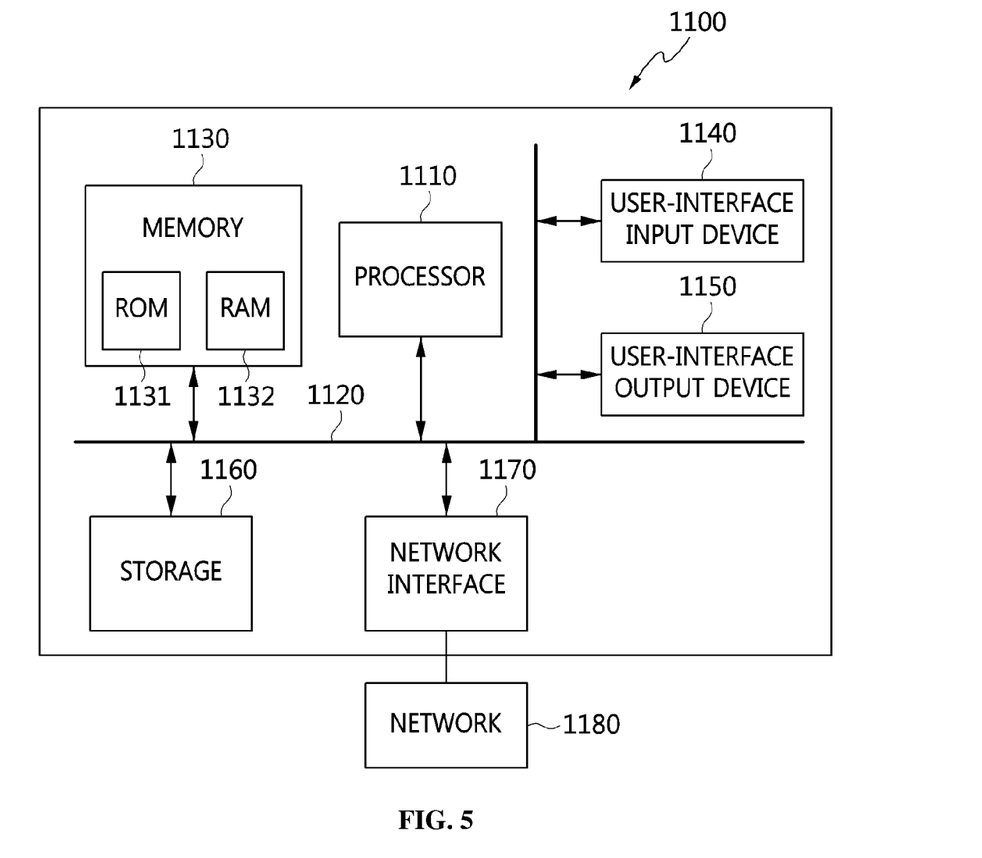
FIG. 5 is a view illustrating a computer system according to an embodiment of the present invention.

FIG. 5 is a view illustrating a computer system according to an embodiment of the present invention.

Referring to FIG. 5, the IoT device authentication apparatus 100 and the IoT device 10 according to an embodiment of the present invention may be implemented in a computer system 1100 including a computer-readable recording medium. As shown in FIG. 5, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

Each of the IoT device authentication apparatus 100 and the IoT device 10 according to an embodiment of the present invention includes one or more processors and executable memory for storing at least one program executed by the one or more processors.

The at least one program executed by the one or more processors of the IoT device authentication apparatus 100 may transmit a random number to the IoT device 10, encrypt the random number using a previously registered first white-box cryptography value through a white-box cryptography method, and perform authentication of the IoT device by checking whether the random number encrypted using the white-box cryptography method matches the random number encrypted using a PUF, which is received from the IoT device. The IoT device may generate a first device response value from a previously registered first device challenge value using the PUF and encrypt the random number, received from the IoT device authentication apparatus, using the first device response value.

Here, when authentication of the IoT device 10 succeeds, the at least one program executed by the one or more processors of the IoT device authentication apparatus 100 may encrypt a previously registered first server challenge value using the first white-box cryptography value, and the IoT device 10 may decrypt the encrypted first server challenge value, received from the IoT device authentication apparatus, using the first device response value.

Here, the at least one program executed by the one or more processors of the IoT device 10 may perform authentication of the IoT device authentication apparatus 100 by checking whether the decrypted first server challenge value matches the previously registered first device challenge value.

Here, when authentication of the IoT device authentication apparatus 100 succeeds, the at least one program executed by the one or more processors of the IoT device 10 may generate a second device challenge value by combining the first device challenge value with the random number, generate a second device response value from the second device challenge value through the PUF, and generate the second white-box cryptography value using the second device response value.

Here, the at least one program executed by the one or more processors of the IoT device authentication apparatus 100 may generate a second server challenge value by combining the first server challenge value with the random number, generate a second server response value from the second server challenge value through the PUF, and generate the second white-box cryptography value using the second server response value.

Here, the at least one program executed by the one or more processors of the IoT device 10 may update the first device challenge value with the second device challenge value, and at this time, the at least one program may update the first server challenge value and the first white-box cryptography value with the second server challenge value and the second white-box cryptography value.

Here, upon confirming that authentication of the IoT device 10, performed by the IoT device authentication apparatus 100, succeeds, the at least one program executed by the one or more processors of the IoT device 10 may generate a second device challenge value by combining the first device challenge value with the random number, generate a second device response value from the second device challenge value through the PUF, and generate a second white-box cryptography value using the second device response value as an encryption key.

Here, the at least one program executed by the one or more processors of the IoT device 10 may update the first device challenge value with the second device challenge value, and the IoT device authentication apparatus 100 may update the first white-box cryptography value with the second white-box cryptography value.

The above-described apparatus and method for authenticating an IoT device based on a PUF using white-box cryptography according to an embodiment of the present invention are configured to start authentication based on a single initial CRP, unlike the existing method, and to share information about the challenge value of the initial CRP and a white-box cipher generated based on a response value corresponding to the challenge value between the device and the device authentication apparatus, thereby overcoming a security vulnerability attributable to direct exposure of the CRP.

Also, the apparatus and method for authenticating an IoT device based on a PUF using white-box cryptography according to an embodiment of the present invention do not require management of multiple CRPs, unlike the existing method, whereby the load on the authentication server may be minimized. Also, because exposure of the CRP in the authentication server or along the communication path is impossible, effective and secure authentication key management may be provided.

Also, the apparatus and method for authenticating an IoT device based on a PUF using white-box cryptography according to an embodiment of the present invention continuously update a white-box cipher for authentication through a PUF whenever authentication is requested, whereby security threats, such as sniffing, a replay attack, or the like, may be prevented.

The present invention intends to solve the above-described problems occurring in the conventional art, and may provide a method for authenticating an IoT device based on PUF technology.

Also, the present invention may provide an effective device authentication method for preventing a security threat, which can result from exposure of an authentication key, while minimizing the load on an authentication server.

Also, the present invention may provide an authentication method that is robust to the exposure of an authentication key while minimizing the load on an authentication server, which is a problem with the existing method for authenticating an IoT device using PUF technology.

As described above, the apparatus and method for authenticating an IoT device based on a PUF using white-box cryptography according to the present invention are not limitedly applied to the configurations and operations of the above-described embodiments, but all or some of the embodiments may be selectively combined and configured, so that the embodiments may be modified in various ways.

What is claimed is:

1. A method for authenticating an IoT device, performed by an IoT device authentication apparatus, comprising:
   transmitting, by the IoT device authentication apparatus, a random number to the IoT device and encrypting, by the IoT device authentication apparatus, the random number using a previously registered white-box cryptography value through a white-box cryptography method;
   generating, by the IoT device, a first device response value from a previously registered first device challenge value using a Physical Unclonable Function (PUF) and encrypting, by the IoT device, the random number, received from the IoT device authentication apparatus, using the first device response value; and
   checking, by the IoT device authentication apparatus, whether the random number encrypted using the white-box cryptography method matches the random number encrypted using the PUF, which is received from the IoT device, thereby performing authentication of the IoT device.

2. The method of claim 1, further comprising:
   generating a second white-box cryptography value using the PUF.

3. The method of claim 2, wherein generating the second white-box cryptography value is configured such that:
   if authentication of the IoT device succeeds when authentication of the IoT device is performed, the IoT device authentication apparatus encrypts a previously registered first server challenge value using the first white-box cryptography value, and the IoT device decrypts the encrypted first server challenge value, received from the IoT device authentication apparatus, using the first device response value.

4. The method of claim 3, wherein generating the second white-box cryptography value is configured such that the IoT device performs authentication of the IoT device authentication apparatus by checking whether the decrypted first server challenge value matches the previously registered first device challenge value.

5. The method of claim 4, wherein generating the second white-box cryptography value is configured such that, if authentication of the IoT device succeeds when authentication of the IoT device is performed, the IoT device authentication apparatus generates a second device challenge value by combining the first device challenge value with the random number, generates a second device response value from the second device challenge value through the PUF, and generates the second white-box cryptography value using the second device response value.

6. The method of claim 5, wherein generating the second white-box cryptography value is configured such that the IoT device authentication apparatus generates a second server challenge value by combining the first server challenge value with the random number, generates a second server response value from the second server challenge value through the PUF, and generates the second white-box cryptography value using the second server response value.

7. The method of claim 6, wherein generating the second white-box cryptography value is configured such that:
the IoT device updates the first device challenge value with the second device challenge value, and
the IoT device authentication apparatus updates the first server challenge value and the first white-box cryptography value with the second server challenge value and the second white-box cryptography value.

8. The method of claim 2, wherein generating the second white-box cryptography value is configured such that, if authentication of the IoT device succeeds when authentication of the IoT device is performed, the IoT device generates a second device challenge value by combining the first device challenge value with the random number, generates a second device response value from the second device challenge value through the PUF, and generates the second white-box cryptography value using the second device response value as an encryption key.

9. The method of claim 8, wherein generating the second white-box cryptography value is configured such that:
the IoT device updates the first device challenge value with the second device challenge value, and
the IoT device authentication apparatus updates the first white-box cryptography value with the second white-box cryptography value.

10. An apparatus for authenticating an IoT device, comprising:
one or more processors; and
executable memory for storing at least one program executed by the one or more processors,
wherein:

the at least one program transmits a random number to the IoT device, encrypts the random number using a previously registered first white-box cryptography value through a white-box cryptography method, and performs authentication of the IoT device by checking whether the random number encrypted using the white-box cryptography method matches the random number encrypted using a Physical Unclonable Function (PUF), which is received from the IoT device, and the IoT device generates a first device response value from a previously registered first device challenge value using the PUF and encrypts the random number, received from the apparatus, using the first device response value.

11. The apparatus of claim 10, wherein:
the at least one program encrypts a previously registered first server challenge value using the first white-box cryptography value when authentication of the IoT device succeeds, and
the IoT device decrypts the encrypted first server challenge value, received from the apparatus, using the first device response value.

12. The apparatus of claim 11, wherein the IoT device performs authentication of the apparatus by checking whether the decrypted first server challenge value matches the previously registered first device challenge value.

13. The apparatus of claim 12, wherein, when authentication of the apparatus succeeds, the IoT device generates a second device challenge value by combining the first device challenge value with the random number, generates a second device response value from the second device challenge value through the PUF, and generates a second white-box cryptography value using the second device response value.

14. The apparatus of claim 13, wherein the at least one program generates a second server challenge value by combining the first server challenge value with the random number, generates a second server response value from the second server challenge value through the PUF, and generates the second white-box cryptography value using the second server response value.

15. The apparatus of claim 14, wherein:
the IoT device updates the first device challenge value with the second device challenge value, and
the at least one program updates the first server challenge value and the first white-box cryptography value with the second server challenge value and the second white-box cryptography value.

16. The apparatus of claim 10, wherein, when authentication of the IoT device succeeds, the IoT device generates a second device challenge value by combining the first device challenge value with the random number, generates a second device response value from the second device challenge value through the PUF, and generates a second white-box cryptography value using the second device response value as an encryption key.

17. The apparatus of claim 16, wherein the IoT device updates the first device challenge value with the second device challenge value, and the apparatus updates the first white-box cryptography value with the second white-box cryptography value.

* * * * *